the

US009122975B2

(12) United States Patent
Inui et al.

(10) Patent No.: US 9,122,975 B2
(45) Date of Patent: Sep. 1, 2015

(54) PRINTING APPARATUS, METHOD OF CONTROLLING THE SAME, AND STORAGE MEDIUM FOR SETTING INFORMATION ON SHEETS

(71) Applicant: CANON KABUSHIKI KAISHA, Tokyo (JP)

(72) Inventors: Masanobu Inui, Chigasaki (JP); Yoshiro Tachibana, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/300,833

(22) Filed: Jun. 10, 2014

(65) Prior Publication Data
US 2014/0376026 A1    Dec. 25, 2014

(30) Foreign Application Priority Data
Jun. 21, 2013    (JP) .................................. 2013-131054

(51) Int. Cl.
*G06K 15/02*    (2006.01)
*G06K 15/00*    (2006.01)
*G03G 15/00*    (2006.01)

(52) U.S. Cl.
CPC ........ *G06K 15/1809* (2013.01); *G03G 15/6514* (2013.01); *G06K 15/4065* (2013.01); *G03G 2215/00392* (2013.01); *G03G 2215/00734* (2013.01)

(58) Field of Classification Search
USPC ................ 358/1.12, 1.14, 1.13, 1.15; 400/76; 271/5, 298
See application file for complete search history.

(56) References Cited

U.S. PATENT DOCUMENTS

| | | | |
|---|---|---|---|
| 5,826,156 A | 10/1998 | Natsume et al. | |
| 7,952,731 B2* | 5/2011 | Utsunomiya et al. | 358/1.13 |
| 8,743,380 B2* | 6/2014 | Okada | 358/1.12 |
| 8,867,057 B2* | 10/2014 | Negishi | 358/1.14 |
| 2008/0174793 A1* | 7/2008 | Mutsuno | 358/1.6 |
| 2011/0051162 A1* | 3/2011 | Okada | 358/1.12 |
| 2011/0163491 A1* | 7/2011 | Suzuki | 271/5 |
| 2011/0229237 A1* | 9/2011 | Hayashi | 400/76 |
| 2011/0236105 A1* | 9/2011 | Noguchi et al. | 400/76 |

FOREIGN PATENT DOCUMENTS

| | | |
|---|---|---|
| JP | 9-230649 A | 9/1997 |
| JP | 2003-192158 A | 7/2003 |
| JP | 2005-292374 A | 10/2005 |

OTHER PUBLICATIONS

European Search Report dated Sep. 26, 2014 issued in corresponding European Patent Application No. 14002049.6.

* cited by examiner

*Primary Examiner* — Allen H Nguyen
(74) *Attorney, Agent, or Firm* — Fitzpatrick, Cella, Harper & Scinto

(57) ABSTRACT

Provided is a printing apparatus that, if information on sheets held by sheet holding unit for holding sheets is set, prints images based on the set information on sheets, and a method for controlling the printing apparatus. In a case that a job that uses the sheet holding unit has been interrupted when sheets are placed on the sheet holding unit, printing is performed based on information on sheets that was designated by the job.

8 Claims, 12 Drawing Sheets

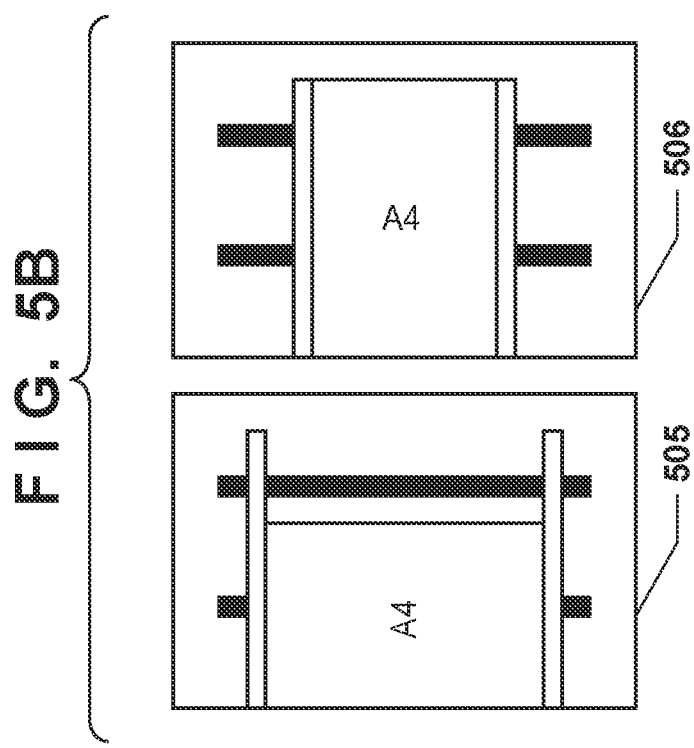
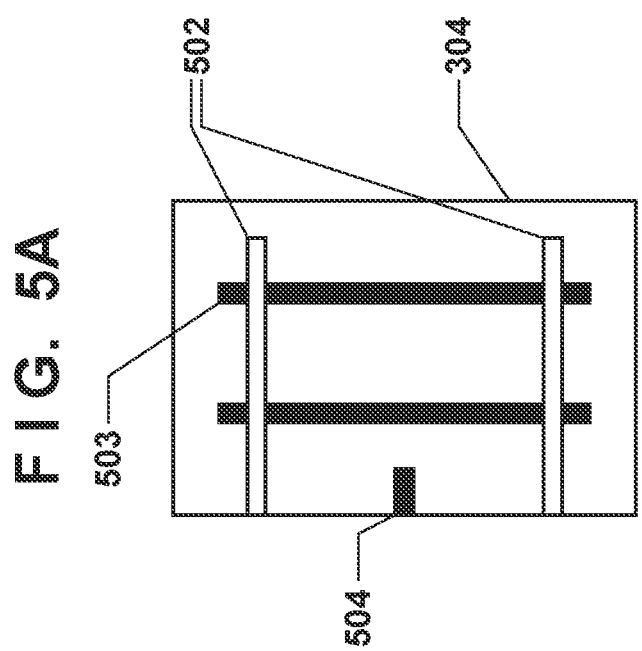

FIG. 6A <SHEET SIZE>

A/B SIZE: A4, A4R, A3, A5, A5R, B4, B5, B5R

601

USER SETTING — 602
ENVELOPE — 603
FREQUENTLY-USED SHEET — 604

FORWARD — 605

FIG. 6B <SHEET TYPE>

606: THIN PAPER, PLAIN PAPER, HEAVY PAPER, RECYCLED PAPER, COLOR PAPER, JAPANESE PAPER, OHP

607 BACK    608 OK

FIG. 6C <INPUT OF USER-CONFIGURABLE SIZE>

610 X [ ] mm
611 Y [ ] mm

612: 1 2 3 / 4 5 6 / 7 8 9 / C 0

613 CANCEL    614 OK

FIG. 6D <ENVELOPE SIZE>

616: N3, Com10, Monarch, K2, Y0, ISO-B5

617 CANCEL    618 OK

F I G. 6E

<USER MODE> 620

- SHEET SETTING
- CASSETTE AUTO-SELECTION — 621
- DEFAULT SETTING FOR MANUAL FEED TRAY — 619
- SETTING OF FREQUENTLY-USED SHEET — 622

CLOSE

F I G. 6F

<SHEET SETTING>

624

| 1 | A4  |
| 2 | A4R |
| 3 | A3  |
| 4 | A5  |

SET — 625

CLOSE — 626

F I G. 6G

<DEFAULT SETTING REGISTRATION FOR MANUALLY FED SHEET>

FIXED — 628    SET EACH TIME OF PLACEMENT — 629

630 — SHEET SIZE    A4
631 — SHEET TYPE    PLAIN PAPER    REGISTRATION

OK

F I G. 6H

<DEFAULT SETTING REGISTRATION FOR MANUALLY FED SHEET>

FIXED    SET EACH TIME OF PLACEMENT — 635

SET FREQUENTLY-USED SHEET AS DEFAULT

636 — ON    OFF — 637

OK

F I G. 10A

| SHEET FEED CASSETTE STAGE | SHEET SIZE | X SIZE | Y SIZE | SHEET TYPE |
|---|---|---|---|---|
| CASSETTE 1 | A4 | — | — | PLAIN PAPER |
| CASSETTE 2 | N3 | — | — | HEAVY PAPER |
| CASSETTE 3 | USER-CONFIGURABLE | 210mm | 297mm | PLAIN PAPER |
| CASSETTE 4 | B4 | — | — | PLAIN PAPER |
| MANUAL FEED TRAY | NOT SET | — | — | NOT SET |

F I G. 10B

| | MODE | SIZE | X SIZE | Y SIZE | SHEET TYPE |
|---|---|---|---|---|---|
| DEFAULT SETTING FOR MANUAL FEED TRAY | FIXED | A4 | — | — | PLAIN PAPER |

F I G. 10C

| | SIZE | SHEET TYPE |
|---|---|---|
| PRESET 1 | A4 | PLAIN PAPER |
| PRESET 2 | A4R | HEAVY PAPER |
| PRESET 3 | A3 | PLAIN PAPER |
| PRESET 4 | A5 | PLAIN PAPER |
| PRESET 5 | NOT SET | NOT SET |

F I G. 10D

| | MODE | SIZE | X SIZE | Y SIZE | SHEET TYPE | FREQUENTLY-USED SETTING |
|---|---|---|---|---|---|---|
| DEFAULT SETTING FOR MANUAL FEED TRAY | FIXED | A4 | — | — | PLAIN PAPER | ON |

PRINTING APPARATUS, METHOD OF CONTROLLING THE SAME, AND STORAGE MEDIUM FOR SETTING INFORMATION ON SHEETS

BACKGROUND OF THE INVENTION

1. Field of the Invention

The present invention relates to a printing apparatus, a method of controlling the same, and a storage medium.

2. Description of the Related Art

An image forming apparatus includes one or more sheet storage units, and feeds sheets stored in the sheet storage units one by one, thus performing image formation on the sheets. The sheet storage units include cassettes for storing sheets in the apparatus, a deck on which a large amount of sheets are stored, and a manual feed tray on which a small amount of sheets can easily be placed instead of being stored inside the apparatus. Sheets that have the special shape and type such that they cannot be placed in the sheet feed cassettes are often set on the manual feed tray, and it is common that each time a user places sheets on the manual feed tray, the user is required to set the shape and type of the sheets.

Japanese Patent Laid-Open No. 2003-192158 discloses a technique for preventing, when a manual feed tray has run out of sheets and a user has to set sheets on the manual feed tray again, the sheet size from being misrecognized without regard to a guide width sensing mechanism of the manual feed tray, and wrong-sized sheets from being conveyed.

When feeding sheets from a manual feed tray or a similar sheet storage unit and then performing printing, there may be a case where, after a print job was input, sheets are placed on the sheet storage unit that has run out of sheets. At that time, although the print job for which the sheet size and the sheet type were already defined is being executed, setting of the sheet size and the sheet type has to be performed again at a timing at which sheets are placed on the sheet storage unit. Therefore, the user needs to input again sheet information for the sheet storage unit.

SUMMARY OF THE INVENTION

An aspect of the present invention is to eliminate the above-mentioned problems which are found in the conventional technology.

A feature of the present invention is to provide a technique in which, if a job that uses a sheet holding unit has been interrupted when sheets are placed on the sheet holding unit, printing is performed based on information on sheets that was designated by the job.

According to an aspect of the present invention, there is provided printing apparatus comprising: a sheet holding unit configured to hold sheets; a setting unit configured to set information on sheets held by the sheet holding unit; and a printing unit configured to print images based on the information on sheets set by the setting unit, wherein, in a case that a job that uses the sheet holding unit has been interrupted when sheets are placed on the sheet holding unit, the printing unit performs printing based on information on sheets designated by the job.

According to an aspect of the present invention, there is provided a method for controlling a printing apparatus, comprising the steps of: setting information on sheets held by a sheet holding unit for holding sheets in order to let a printing unit perform printing based on the information on sheets; and controlling, in a case that a job that uses the sheet holding unit has been interrupted when sheets are placed on the sheet holding unit, the printing unit to perform printing based on information on sheets designated by the job.

According to an aspect of the present invention, there is provided a printing apparatus, comprising: a sheet holding unit configured to hold sheets; a setting unit configured to set information on sheets holed by the sheet holding unit; and a printing unit configured to print images based on the information on sheets set by the setting unit, wherein, when sheets are placed on the sheet holding unit, the setting unit sets information on sheets that corresponds to a button selected via a screen that displays buttons each associated with information on sheets in advance.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B depict overhead views of a manual feed tray.

FIGS. 6A to 6H are diagrams illustrating a method for setting a sheet size and a sheet type in the MFP according to the first embodiment.

FIG. 10A is a diagram illustrating examples of sheet information that were set for sheet feed cassettes and the manual feed tray in sheet information setting processing according to the first embodiment.

FIG. 10B is a diagram illustrating examples of information after default settings for the manual feed tray were configured according to the first embodiment.

FIG. 10C is a diagram illustrating examples of data set in "frequently-used sheet setting".

FIG. 10D is a diagram illustrating examples of information after default settings for the manual feed tray were configured according to a second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
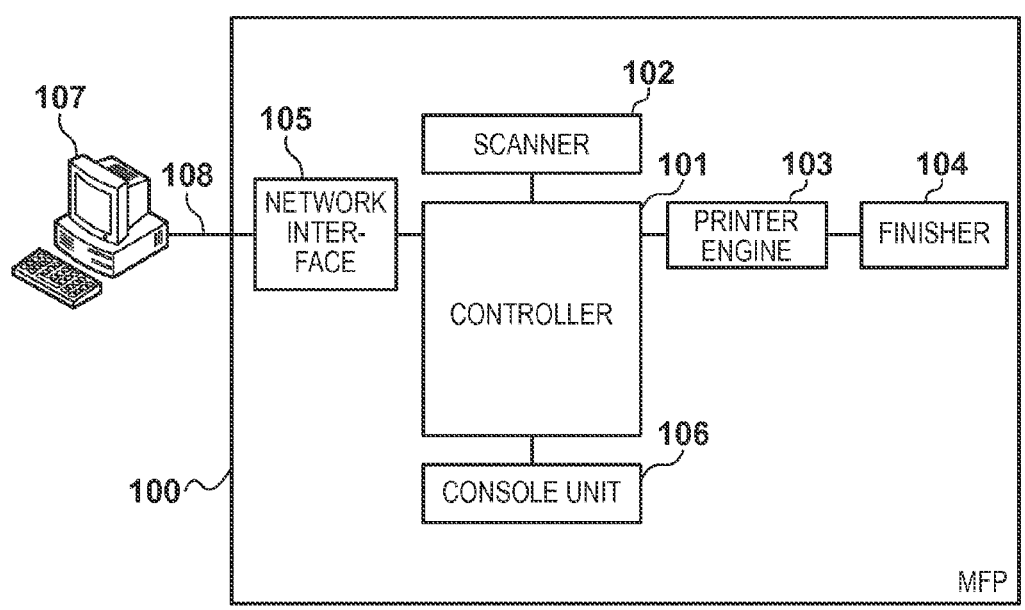
FIG. 1 is a block diagram illustrating a configuration of a multi-function peripheral (MFP), which is an example of an image processing apparatus according to a first embodiment of the present invention.

FIG. 1 is a block diagram illustrating a configuration of a Multi-Function Peripheral (MFP) 100, which serves as an example of an image forming apparatus according to a first embodiment of the present invention.

Figure 2:
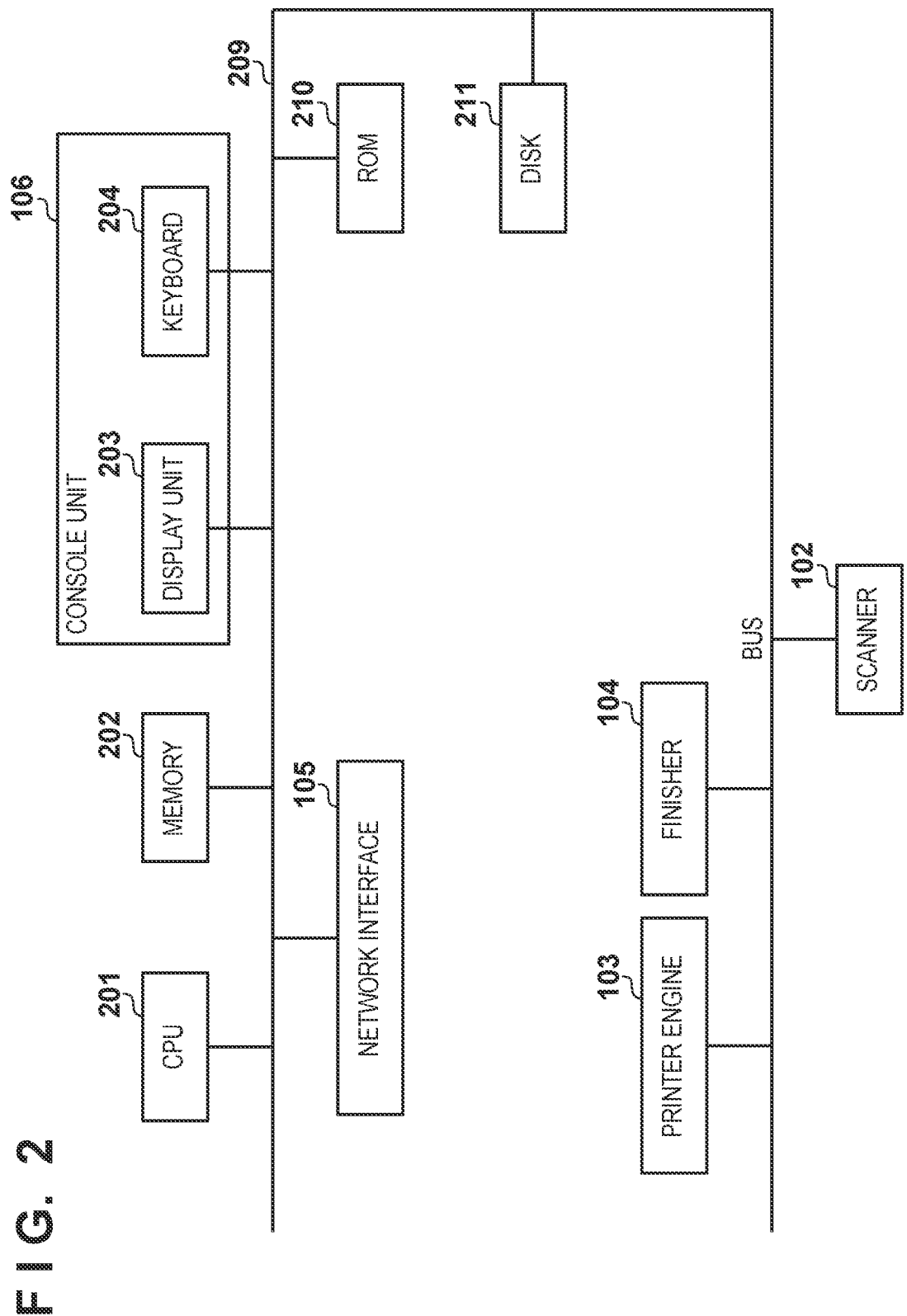
FIG. 2 is a block diagram illustrating a configuration of a controller and connection between the controller and the peripherals thereof according to the first embodiment.

In FIG. 1, a controller 101 controls the MFP 100, and has a hardware configuration shown in FIG. 2. A scanner 102 reads an original document under control of the controller 101, and outputs image data that corresponds to an image of the original document. A printer engine 103 is, in this embodiment, a laser beam printer engine and performs printing under control of the controller 101. The printer engine 103 is connected to a finisher 104, and the finisher 104 can staple a plurality of record media (for example, sheets) discharged from the printer engine 103 together. Note that the finisher 104 as well is controlled by the controller 101. A network interface 105 can perform two-way communication with a PC 107 via a network 108. A console unit 106 includes a display unit having a touch panel function, various types of hard keys, and the like, and is configured to display images, messages, and the like based on the information from the controller 101, and to give instructions from users to the controller 101.

FIG. 2 is a block diagram illustrating a configuration of the controller 101 and connection between the controller 101 and the peripherals thereof according to the first embodiment.

In the controller 101, a CPU 201 is connected, via a bus 209, to a memory 202, a display unit 203 and a keyboard 204, which constitute the console unit 106, a ROM 210, and a disk 211. Various types of programs and data that are to be executed by the CPU 201 are stored in the disk 211 such as a hard disk or a Floppy™ disk, and these programs are sequentially read on the memory 202 as needed and executed under control of the CPU 201. This disk 211 may be removable from and attachable to the MFP 100, or may be built in the MFP 100. Furthermore, a configuration is also possible in which the programs are downloaded from another MFP, a PC, or the like via the network 108 and stored in the disk 211. Furthermore, the memory 202 may have functions of both a volatile memory such as a DRAM and a nonvolatile memory such as a nvSRAM, or a configuration is also possible in which the memory 202 functions as a volatile memory and the disk 211 functions as a nonvolatile memory. Alternatively, the memory 202 may be a removable memory medium.

The CPU 201 performs display by outputting data on the display unit 203, and receives an instruction from a user by inputting data from the keyboard 204 or the display unit 203 having a touch panel function. The input information is transmitted to the memory 202 or the disk 211, is accumulated there, and is used for various types of processing. Furthermore, the network interface 105 is connected to the bus 209. The CPU 201 performs communication using the interface by reading or writing data from or into the interface.

Moreover, the printer engine 103, the finisher 104, and the scanner 102 are connected to the bus 209. By reading or writing data from or into these engines, the CPU 201 can control operations of the engines, such as printing or scanning, and can obtain various types of status. Image data obtained from the scanner 102 or the network interface 105 can be saved in the disk 211 or the memory 202 of the controller 101. Furthermore, by mounting a removable memory, in which image data is accumulated in advance, on the controller 101, it is also possible to import the image data. The image data accumulated in the disk 211 can be shifted or copied to the memory 202, and it is possible to combine with the image data of the memory 202 various additional images (for example, numeric characters of page numbers) depending on contents of instructions from the console unit 106. Note that a configuration is also possible in which the scanner 102, the printer engine 103, and the finisher 104 are provided not in the MFP 100 but as separate peripheral devices on the network, and are controlled by the controller 101 of the MFP 100.

Figure 3:
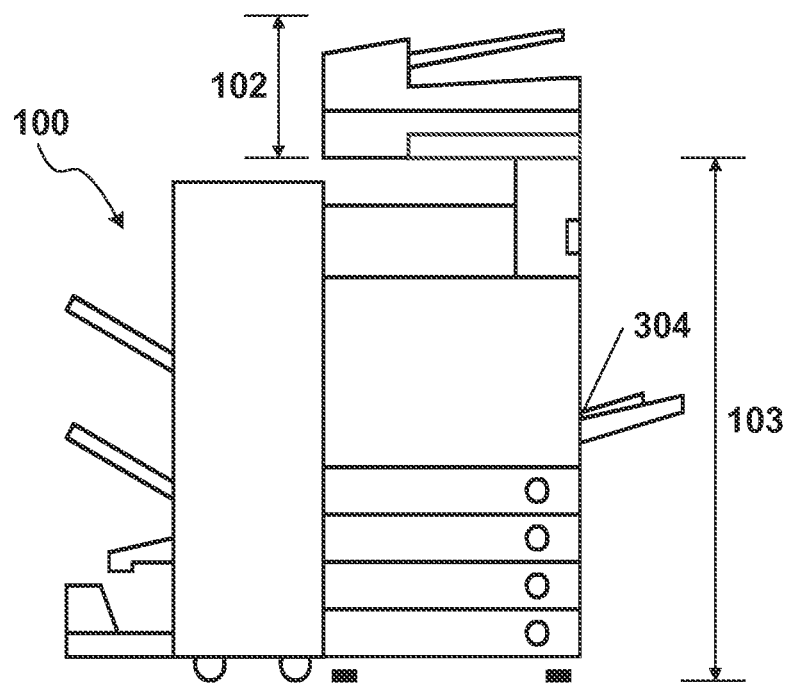
FIG. 3 depicts an overview of the MFP according to the first embodiment.

FIG. 3 depicts an overview of the MFP 100 according to the first embodiment.

The scanner 102 illuminates an image of an original document, scans the original document with a CCD line sensor, and thereby converts the image of the original document into electrical image data. Determination of color and size of the original document is performed based on the electrical image data.

The printer engine 103 prints images on sheets based on the image data. Then, the finisher 104 performs post-processing, such as stapling or binding, on the printed sheets, and outputs the sheets. Activation and termination of printing operation are performed by instructions from the CPU 201. The reference numeral 304 denotes a manual feed tray. Here, the printer engine 103 includes the manual feed tray 304 and a plurality of sheet feed stages (sheet feed cassettes: sheet storage units).

Figure 4:
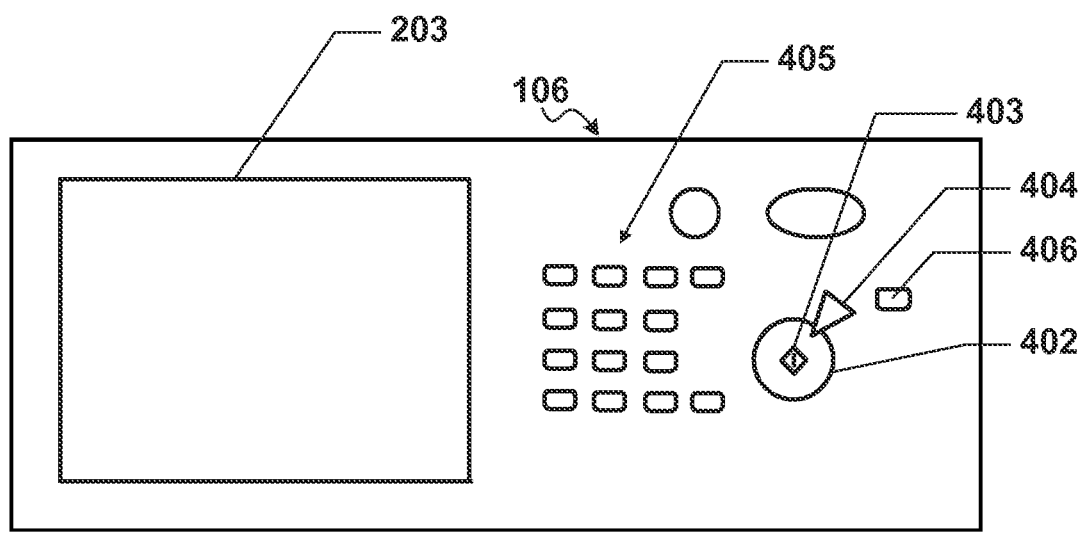
FIG. 4 depicts a top view of a console unit of the MFP according to the first embodiment.

FIG. 4 depicts a top view of the console unit 106 of the MFP 100 according to the first embodiment.

The display unit 203 has a touch panel sheet adhered to a liquid crystal screen thereof, and is configured to display an operation screen and soft keys, and to transmit, if any of the displayed keys is pressed, position information of the pressed key to the CPU 201. A start key 402 is used for starting, for example, operation for reading an image of an original document. The start key 402 includes, in the central part thereof, a two-color (green and red) LED 403, green indicating the state in which the start key 402 is ready for use, and red indicating the state in which the start key 402 is non-usable. A stop key 404 functions to stop a job operation that is being executed. A numeric keypad 405 is constituted by a group of number and character buttons, and is used for setting the number of copies, inputting facsimile numbers, and the like. A user mode key 406 is pressed when, for example, apparatus settings are configured.

FIGS. 5A and 5B depict overhead views of the manual feed tray 304 of the MFP 100.

In FIG. 5A, the manual feed tray 304 includes guides 502 that are freely movable on rails 503, and the positions of these guides 502 can be adjusted according to the size of sheets that are to be placed.

The reference numeral 505 of FIG. 5B indicates the positions of the guides when A4 size sheets are placed in the longitudinal direction, and the reference numeral 506 indicates the positions of the guides when A4 size sheets are placed in the lateral direction. A sensor 504 detects that sheets have been placed on the manual feed tray 304. If sheets are placed on this sensor 504, the controller 101 can detect that the sheets are placed on the manual feed tray 304.

FIGS. 6A to 6H are diagrams illustrating a method for setting a sheet size and a sheet type in the MFP 100 according to the first embodiment.

Setting of sheet information for the manual feed tray 304 is performed such that the sensor 504 detects placement of sheets if the sheets are placed on the manual feed tray 304, and a sheet size setting screen shown in FIG. 6A is displayed. The sheet size can be set via this screen.

A standard size button group 601 is a group of buttons for setting a standard sheet size, and a user can register a standard sheet size the user wants to set for the manual feed tray 304 by pressing a button that corresponds to the size.

A user setting button 602 is pressed when the user wants to set sheets having a particular size. If the user setting button 602 is pressed, a user-configurable size input screen shown in FIG. 6C is displayed. In FIG. 6C, a button X 610 is pressed when a user sets the size in the lateral direction, and the user sets the desired size (length (as a unit of mm)) using a numeric button group 612. A button Y 611 is pressed when the user sets the size in the longitudinal direction, and the user sets the size (length) in the longitudinal direction using the numeric button group 612. A cancel button 613 is pressed when the user wants to cancel the setting in this screen. When the cancel button 613 is pressed, the screen returns to the sheet size setting screen of FIG. 6A without completing the setting of the sheet size. When the user presses an OK button 614 after having completed the setting of the sizes in the longitudinal and lateral directions, the sizes of the sheets that were set in this screen are set for the manual feed tray 304, and the screen returns to the sheet size setting screen of FIG. 6A.

An envelope button 603 of FIG. 6A is pressed when an envelope size is set. When the envelope button 603 is pressed, an envelope size input screen shown in FIG. 6D is displayed. This screen includes an envelope size setting button group 616, and the user can set the envelope size by pressing any one of the buttons. Here, "N3" is selected as a default. This default setting varies depending on destinations (destinations are information on countries or regions in which the apparatus is installed, and are saved in the memory 202 or the disk 211 of the controller 101). In the case where the destination is Japan, "N3" is set as a default, and in the case where the destination is any foreign country, "Com10" is set as a default. A cancel button 617 is pressed when the user wants to cancel the setting in this envelope size input screen. When the cancel button 617 is pressed, the screen returns to the sheet size setting screen of FIG. 6A without completing the setting. An OK button 618 is pressed when the user determines the envelope size in the screen of FIG. 6D. When the OK button 618 is pressed, the setting in the screen of FIG. 6D is established, and the screen returns to the sheet size setting screen of FIG. 6A.

After a standard size, a user-configurable size, or an envelope size was set in this way, the screen returns to the sheet size setting screen of FIG. 6A, and, when a forward button 605 is pressed, a sheet type setting screen of FIG. 6B is displayed. This screen includes a sheet type setting button group 606, and the user can set a sheet type by pressing any one of the buttons. A back button 607 is pressed when the user wants to stop the setting in this screen. When the back button 607 is pressed, the screen returns to the screen of FIG. 6A without completing the setting of the sheet type. An OK button 608 is pressed when the user completes the setting of the sheet type. When the OK button 608 is pressed, the setting of the sheet type is completed, and the screen is closed. Furthermore, if the user wants to configure settings of sheets for another sheet feed stage, the user performs a cassette selecting operation in the screen of FIG. 6F so as to select a cassette, and repeats the above-described setting procedures.

If the user does not configure the setting, the user presses a close button 626, thereby returning to the sheet size setting screen of FIG. 6A.

Figure 9:
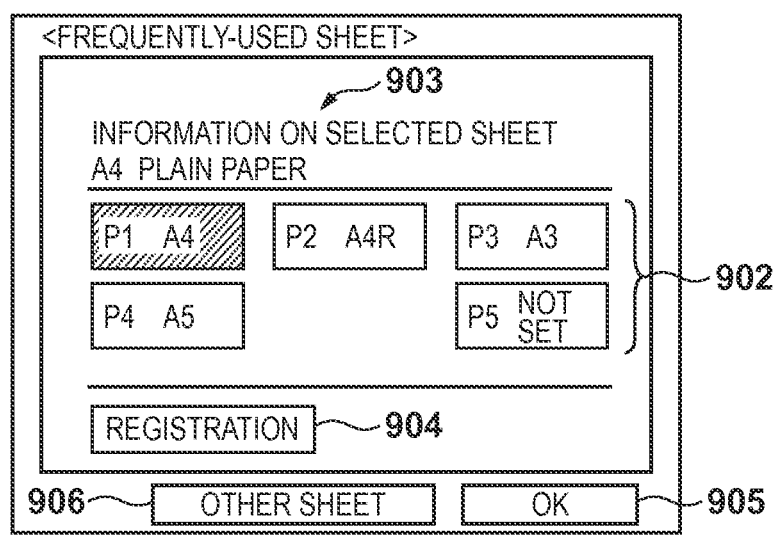
FIG. 9 is a diagram illustrating an example of a "frequently-used sheet" setting screen that is displayed on the console unit of the MFP according to the first embodiment.

Furthermore, when a frequently-used sheet button 604 of FIG. 6A is pressed, the screen shifts to the screen of FIG. 9, and in the screen of FIG. 9, the user can select and set a desired sheet size from among the preset sheet sizes. Note that a user mode screen of FIG. 6E may also shift to the screen of FIG. 9, as will be described later.

In order to set sheet information for the sheet feed cassette, the cassette size and the cassette type are set from the user mode screen of FIG. 6E. When the user mode key 406 of the console unit 106 is pressed, the user mode screen of FIG. 6E is displayed. A sheet size can be set via this screen. In FIG. 6E, by pressing one button of a button group 621 that corresponds to "sheet setting", which belongs to button function contents denoted by reference numeral 620, a sheet setting screen for cassettes shown in FIG. 6F is displayed. This screen includes a cassette selecting button group 624, and it is possible to select a cassette. When one button of the cassette selecting button group 624 is selected and a setting button 625 is pressed, the sheet size setting screen of FIG. 6A is displayed, and it is possible to set the sheet size for the selected cassette by executing the above-described procedures.

Furthermore, in order to perform sheet setting as with cassettes as described above, in contrast to setting of the sheet size each time sheets are placed on the manual feed tray 304, default setting for the manual feed tray 304 is selected in the user mode screen of FIG. 6E. That is, when the user mode key 406 of the console unit 106 is pressed, the user mode screen shown in FIG. 6E is displayed. In this screen, when the user presses a default setting button 619 for the manual feed tray 304, a default setting registration screen for manually fed sheets, which is shown in FIG. 6G, is displayed.

In FIG. 6G, a fix button 628 is pressed when the user always keeps default settings for the manual feed tray 304 fixed. In the state in which the fix button 628 is pressed, the sheet size setting screen of FIG. 6A is not displayed each time sheets are placed on the manual feed tray 304, and the sheet size and the sheet type that are displayed in a sheet information display area 630 are set as fixed. Here, in order to change the sheet size and the sheet type that are to be set, a registration button 631 in the screen of FIG. 6G is pressed. When this registration button 631 is pressed, the sheet size setting screen of FIG. 6A is displayed, and, by executing the above-described procedures, it is possible to set a sheet size and a sheet type for the manual feed tray 304, as defaults.

Furthermore, a setting button 629 of "each time of placement" of FIG. 6G is pressed when sheet information is set each time sheets are placed on the manual feed tray 304 as described above, in contrast to the case where the sheet size for the manual feed tray 304 is fixed. When the setting button 629 of "each time of placement" is pressed, the screen changes to the screen shown in FIG. 6H. In FIG. 6H, the display in the sheet information display area 630 of FIG. 6G is changed to, for example, "set frequently-used sheets as default" in a display area 635 of FIG. 6H. With this, when sheets are placed on the manual feed tray 304, it is possible to select whether to configure setting from the sheet size setting screen of FIG. 6A, or the "frequently-used sheet" setting screen shown FIG. 9, which will be described later. When an ON button 636 of FIG. 6H is pressed, a screen (FIG. 9) that prompts the user to configure setting based on the frequently-used sheets is set as a default, whereas when an OFF button 637 is pressed, the sheet size setting screen of FIG. 6A is set as a default.

FIG. 10A is a diagram illustrating examples of sheet information that were set for the sheet feed cassettes and the manual feed tray 304 in sheet information setting processing according to the first embodiment.

Furthermore, FIG. 10B is a diagram illustrating examples of information after default settings for the manual feed tray 304 were configured. FIG. 10B shows the case where the fix button 628 of FIG. 6G is pressed and sheet information for the manual feed tray 304 is set to A4 size plain paper as fixed. The data is saved in the memory 202 or the disk 211 of the controller 101.

Figure 7:
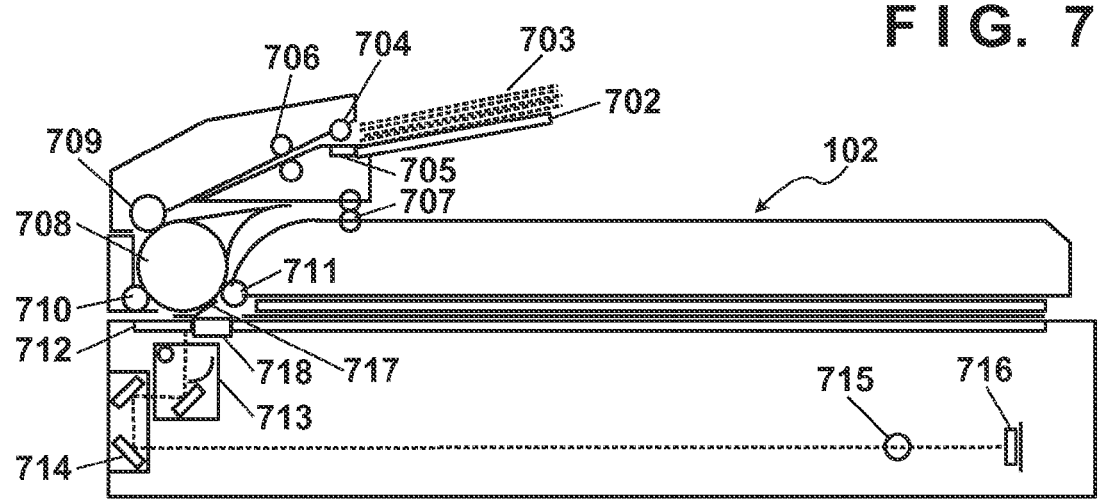
FIG. 7 depicts a cross-sectional view of a scanner of the MFP according to the first embodiment.

FIG. 7 depicts a cross-sectional view of the scanner 102 of the MFP 100 according to the first embodiment.

Original documents 703 are placed on an original tray 702 and fed one by one to an exposure unit 713, and images of the original documents 703 are read while the original documents 703 move. An original document feed roller 704 constitutes a pair with a separation pad 705, and conveys the original documents 703 one by one. The conveyed original documents 703 are fed into the scanner 102 by an intermediate roller 706, and are conveyed by a large roller 708 and a first driven roller 709, and further by a large roller 708 and a second driven roller 710 while being supported therebetween. The original documents 703 conveyed by the large roller 708 and the second driven roller 710 pass between a flowing document reading glass 712 and an original document guide plate 717, pass by a jumping plate 718, and are conveyed while being supported between the large roller 708 and a third driven roller 711. The original documents 703 conveyed by the large roller 708 and the third driven roller 711 are discharged by an original document discharging roller pair 707. Note that the original documents 703 are conveyed between the flowing document reading glass 712 and the original document guide plate 717 while being in contact with the flowing document reading glass 712 due to the original document guide plate 717.

Accordingly, when the original document 703 passes on the flowing document reading glass 712, the face of the document that is in contact with the flowing document reading glass 712 is exposed by the exposure unit 713. As a result, light reflected on the original document 703 passes through a lens 715 via a mirror unit 714 so as to be collected, and the collected light is incident on a CCD sensor 716 and converted into an electric signal. The image signal thus obtained is input into the controller 101.

Figure 8:
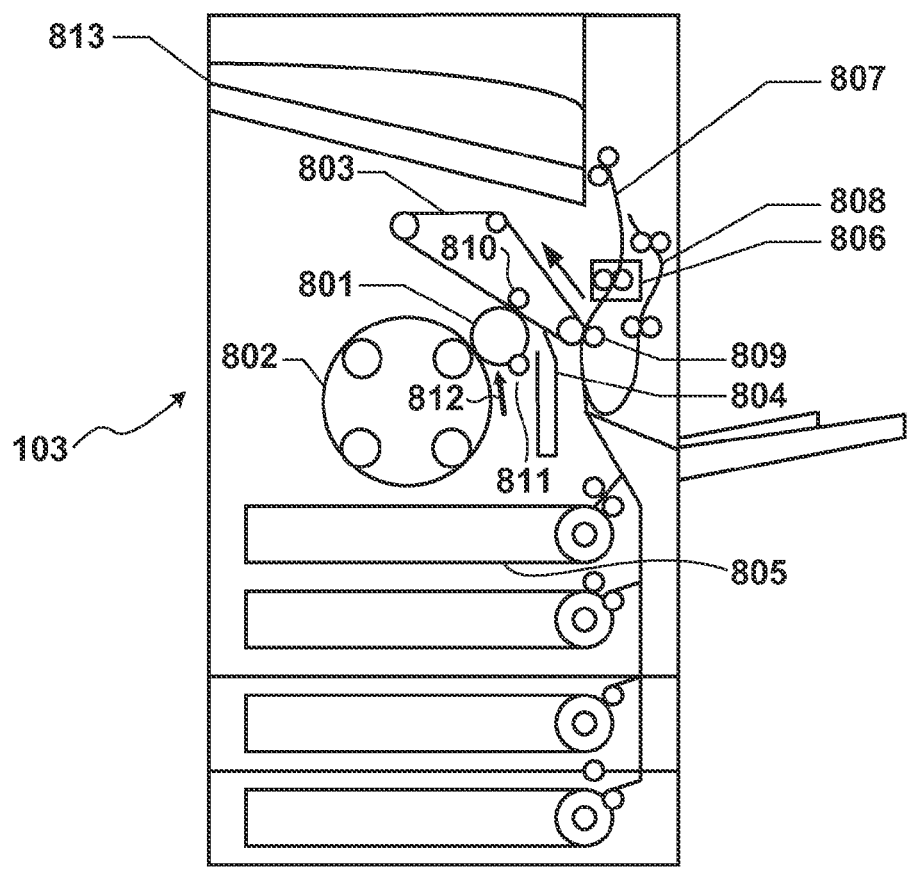
FIG. 8 is a diagram illustrating a configuration of a printer engine of the MFP according to the first embodiment.

FIG. 8 is a diagram illustrating a configuration of the printer engine 103 of the MFP 100 according to the first embodiment. Here, description is given taking a full color laser beam printer as an example.

A photosensitive drum 801 is charged to a given polar potential by a primary charger 811, and is exposed at the position thereof denoted by an arrow 812 by exposure means (not shown). Accordingly, an electrostatic latent image that corresponds to a first color component is formed. Then, the electrostatic latent image is developed using one of four developers 802. An intermediate transfer belt 803 is driven to perform conveyance in the direction indicated by the arrow, and an image of the first color component formed on the photosensitive drum 801 is transferred on an intermediate transfer belt 803 by an electric field that was formed by a primary transfer roller 810 in the course of passing through an interface between the photosensitive drum 801 and the intermediate transfer belt 803. Accordingly, the surface of the photosensitive drum 801 that has undergone transfer on the intermediate transfer belt 803 is cleaned up by a cleaning unit 804. The procedures are repeated in the order and four color images are superposed by the intermediate transfer belt 803, thereby forming a color image. Note that in the case where a unicolor image is formed, the transfer processing is performed only one time. The image transferred on the intermediate transfer belt 803 is printed, by a secondary transfer roller 809, on a sheet fed from the cassette 805. The sheet on which the image is thus printed is heated and fixed by a fixing unit 806. After the fixation, the sheet travels along a pass 807 and is conveyed to a discharge port 813 so as to be discharged. Note that in the case where two-sided printing is performed, a single sided printed sheet passes through a reversing path 808 in a circulating manner, and is conveyed again to the position of the secondary transfer roller 809, where an image is printed on the opposite side to the printed side of the sheet.

FIG. 9 is a diagram illustrating an example of the "frequently-used sheet" setting screen that is to be displayed on the console unit 106 of the MFP 100 according to the first embodiment.

By the user mode key 406 of the console unit 106 being pressed, the screen shown in FIG. 6E is displayed on the display unit 203 of the console unit 106. In the screen of FIG. 6E, when a button 622 of the button group 621 that corresponds to "frequently-used sheet setting" is pressed, the "frequently-used sheet" setting screen shown in FIG. 9 is displayed. This "frequently-used sheet" setting screen includes preset buttons 902, and it is possible to register the size or type of the frequently-used sheet using one of these buttons. The screen of FIG. 9 shows the state in which a preset 1 ("P1 A4") is selected, and an information display area 903 displays the sheet size (A4) and the sheet type (plain paper).

FIG. 10C is a diagram illustrating an example of data set in the "frequently-used sheet setting" according to the first embodiment.

Here, presets 1 to 5, which correspond to the preset buttons 902 of FIG. 9, are stored. Here, the presets 1 to 4 have been set, and only the preset 5 has not yet been set. The preset data is to be saved in the memory 202 or the disk 211 of the controller 101. The data is used when a sheet feed cassette is automatically selected.

Furthermore, the user can press a registration button 904 of FIG. 9 to instruct setting of the sheet sizes and the sheet types for the group of preset buttons 902. If one of the preset buttons 902 is selected and the registration button 904 is pressed, the sheet size setting screen shown in FIG. 6A is displayed, and it is possible to set the sheet size and the sheet type as presets by executing the above-described procedures. When the frequently-used sheet setting is completed in this manner, the user presses an OK button 905 and establishes the settings.

Note that the "frequently-used sheet" setting screen shown in FIG. 9 is displayed not only when sheet information is registered for the preset button 902 but also when the content registered in the preset button 902 is set as sheet information of the manual feed tray 304. In the case where sheet information is registered for the manual feed tray 304, an "other sheet" button 906 of FIG. 9 is displayed. If the user presses this button 906, the screen is switched to the sheet size setting screen of FIG. 6A, and any sheet information, instead of the preset sheet information, can be set for the manual feed tray 304.

Figure 11:
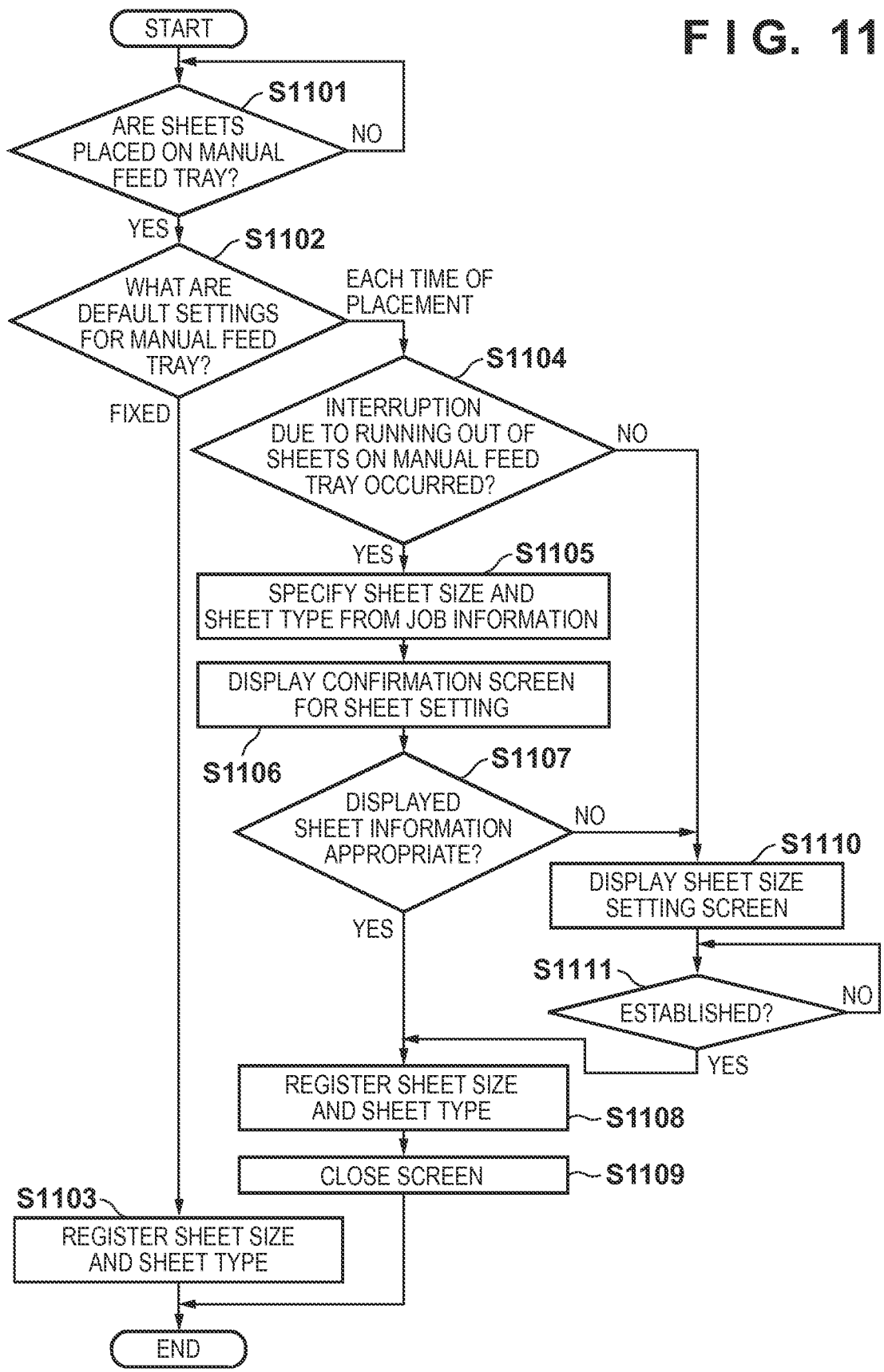
FIG. 11 is a flowchart for describing processing for setting sheet information for the manual feed tray in the MFP according to the first embodiment.

FIG. 11 is a flowchart for describing processing for setting sheet information for the manual feed tray 304 in the MFP 100 according to the first embodiment. Note that a program for executing this processing is installed in the disk 211, is deployed on the memory 202 at the time of execution, and is executed under control of the CPU 201.

First, in step S1101, the CPU 201 determines using the sensor 504 whether or not sheets have been placed on the manual feed tray 304. If it is determined that sheets have been placed on the manual feed tray 304, the procedure advances to step S1102, where the CPU 201 checks the default settings (see FIG. 10B) for the manual feed tray 304 that are stored in the memory 202 or the disk 211. If it is determined in step S1102 that default settings are "fixed", the procedure advances to step S1103. In step S1103, the CPU 201 sets the sheet size and the sheet type that were registered in the FIG. 10B in a field for the manual feed tray of FIG. 10A, which is stored in the memory 202 or the disk 211, and the procedure ends.

Accordingly, in the example of FIG. 10B, plain paper having sheet size of A4 is set for the manual feed tray 304.

On the other hand, if the CPU 201 determines in step S1102 that default settings for the manual feed tray are configured "each time of placement", the procedure advances to step S1104, where the CPU 201 determines whether or not the processing has been interrupted due to the manual feed tray running out of sheets. The interruption due to the manual feed tray running out of sheets refers to the state in which, while, for example, PDL printing processing or copying processing is executed on sheets fed from the manual feed tray 304, the manual feed tray 304 runs out of sheets. If the interruption occurred since the manual feed tray ran out of sheets, the procedure advances to step S1105, where the CPU 201 obtains from data of an interrupted job the sheet size and the sheet type that the job uses. Next, the procedure advance to step S1106, where the CPU 201 displays, on the display unit 203, a confirmation screen for confirming sheets on the manual feed tray shown in FIG. 12.

Figure 12:
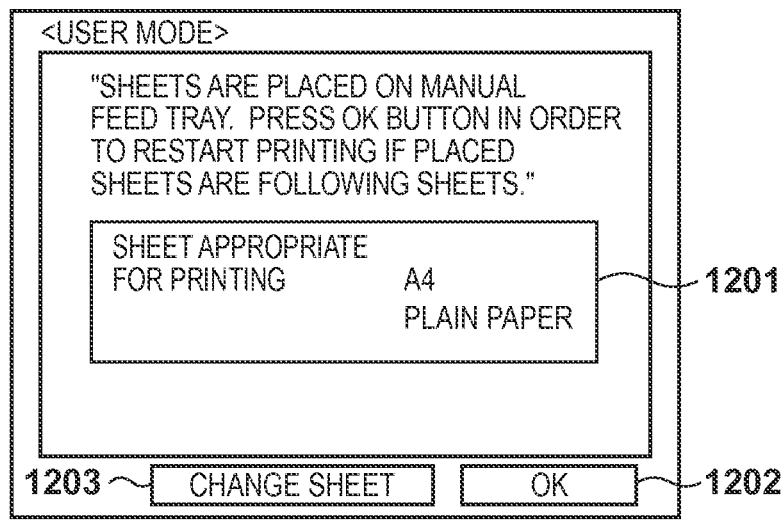
FIG. 12 is a diagram illustrating an example of a confirmation screen for confirming sheets placed on the manual feed tray.

FIG. 12 is a diagram illustrating an example of the confirmation screen for confirming sheets on the manual feed tray. A sheet information area 1201 of this screen displays sheet information obtained in step S1105 by the CPU 201, the sheet information being for use in the job. By displaying this screen, it is possible to prompt the user to determine whether or not the sheets placed on the manual feed tray 304 are appropriate for execution of this job.

Next, in step S1107, the CPU 201 determines whether or not an OK button 1202 or a sheet changing button 1203 has been pressed on the screen of FIG. 12. If the CPU 201 determines that the OK button 1202 has been pressed, the procedure advances to step S1108, where the CPU 201 sets and registers the sheet information obtained in step S1105 in the field for the manual feed tray of FIG. 10A. Then, the procedure advances to step S1109, where the CPU 201 closes the confirmation screen for confirming settings of sheet on the manual feed tray of FIG. 12, and this processing ends.

On the other hand, if the CPU 201 detects in step S1107 that the sheet changing button 1203 of FIG. 12 has been pressed, or if the CPU 201 determines in step S1104 that interruption occurred other than the manual feed tray ran out of sheets, the procedure advances to step S1110. In step S1110, the CPU 201 displays, on the display unit 203, the sheet size setting screen shown in FIG. 6A. Here the user will set the sheet size and the sheet type. Accordingly, the procedure advances to step S1111, where the CPU 201 determines that input of the sheet information via the screen of FIG. 6A is established, and then the procedure advances to step S1108, where the CPU 201 sets the established sheet information in a field for the manual feed tray of FIG. 10A, thereby terminating the processing.

By performing such operations, it is possible to display, on the console unit 106, the screen for setting sheet information for the manual feed tray at a timing at which the user places sheets on the manual feed tray, and the user can determine whether or not the sheets on the manual feed tray are appropriate, thereby improving convenience.

Figure 13:
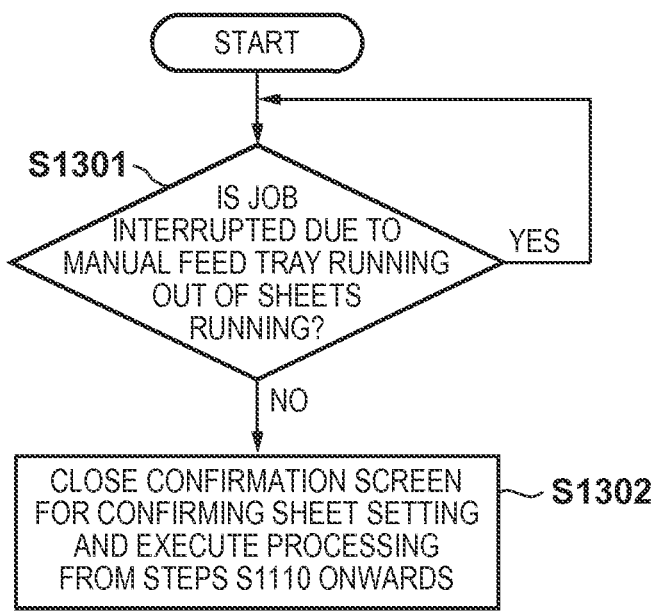
FIG. 13 is a flowchart for describing processing performed, in the MFP according to the first embodiment, when a job that has been interrupted due to the manual feed tray running out of sheets is deleted during the procedure.

FIG. 13 is a flowchart for describing processing performed, in the MFP 100 according to the first embodiment, when a job that has been interrupted due to the manual feed tray running out of sheets is deleted during the procedure. The operation starts in step S1106 of FIG. 11, with display of the confirmation screen for confirming sheet settings (FIG. 12).

First, in step S1301, the CPU 201 determines whether or not a job that has been interrupted due to the manual feed tray running out of sheets is running. For example, if the interrupted job is stopped by the stop key 404, or priority is given to another job and the interrupted job is left behind, it is determined that the job having been interrupted due to running out of sheets is not running.

If the CPU 201 determines in step S1301 that the job having been interrupted due to running out of sheets is not running, the procedure advances to step S1302, where the CPU 201 closes the confirmation screen for confirming sheets on the manual feed tray shown in FIG. 12, and the procedure advances to step S1110 of FIG. 11.

In this first embodiment, it is possible to set sheet information to be set for the manual feed tray using the sheet size setting screen and the sheet type setting screen, similarly to the case of the other sheet feed cassettes. Furthermore, it is possible to select whether to set sheet information set for the manual feed tray as fixed, or to set sheet information each time, that is, at a timing at which sheets are placed on the manual feed tray. In the case of setting sheet information as fixed, when the user places sheets on the manual feed tray, sheet information such as the sheet size and the sheet type that are registered with respect to the manual feed tray are always set for the manual feed tray. On the other hand, in the case of setting sheet information each time sheets are placed, when a job has been interrupted since the manual feed tray ran out of sheets, sheet information used for the interrupted job is displayed. Accordingly, it is possible for the user to determine whether or not the sheets placed on the manual feed tray by the user are appropriate.

According to the first embodiment as described above, it is possible to automatically set sheet information for the manual feed tray at a timing at which sheets are placed on the manual feed tray. Alternatively, it is possible to switch the screen, at this timing, to the screen for setting or confirming sheet information for the manual feed tray. With this, when, for example, interruption occurred since the manual feed tray ran out of sheets, time and effort for setting sheet information for the manual feed tray can significantly be reduced.

Furthermore, if a job has been interrupted due to running out of sheets and an operation screen for avoiding time and effort for inputting sheet information is displayed, change of the job state to a state other than the execution state enables the screen to automatically switch to the screen for manually setting sheet information. With this, it is also possible to prevent the user from registering sheet information that is not intended by mistake. Therefore, a significant reduction in time and effort spent by the user can be achieved.

Second Embodiment

Hereinafter, a second embodiment according to the present invention will be described. Note that system configuration, a configuration of the MFP, and the like according to the second embodiment are the same as those of the above-described first embodiment, and descriptions thereof are omitted.

In this second embodiment, by switching the operation screen displayed on the console unit 106 at a timing at which sheets are placed on the manual feed tray 304, time and effort for setting sheet information for the manual feed tray are reduced particularly when interruption occurred since the manual feed tray ran out of sheets.

Figure 14:
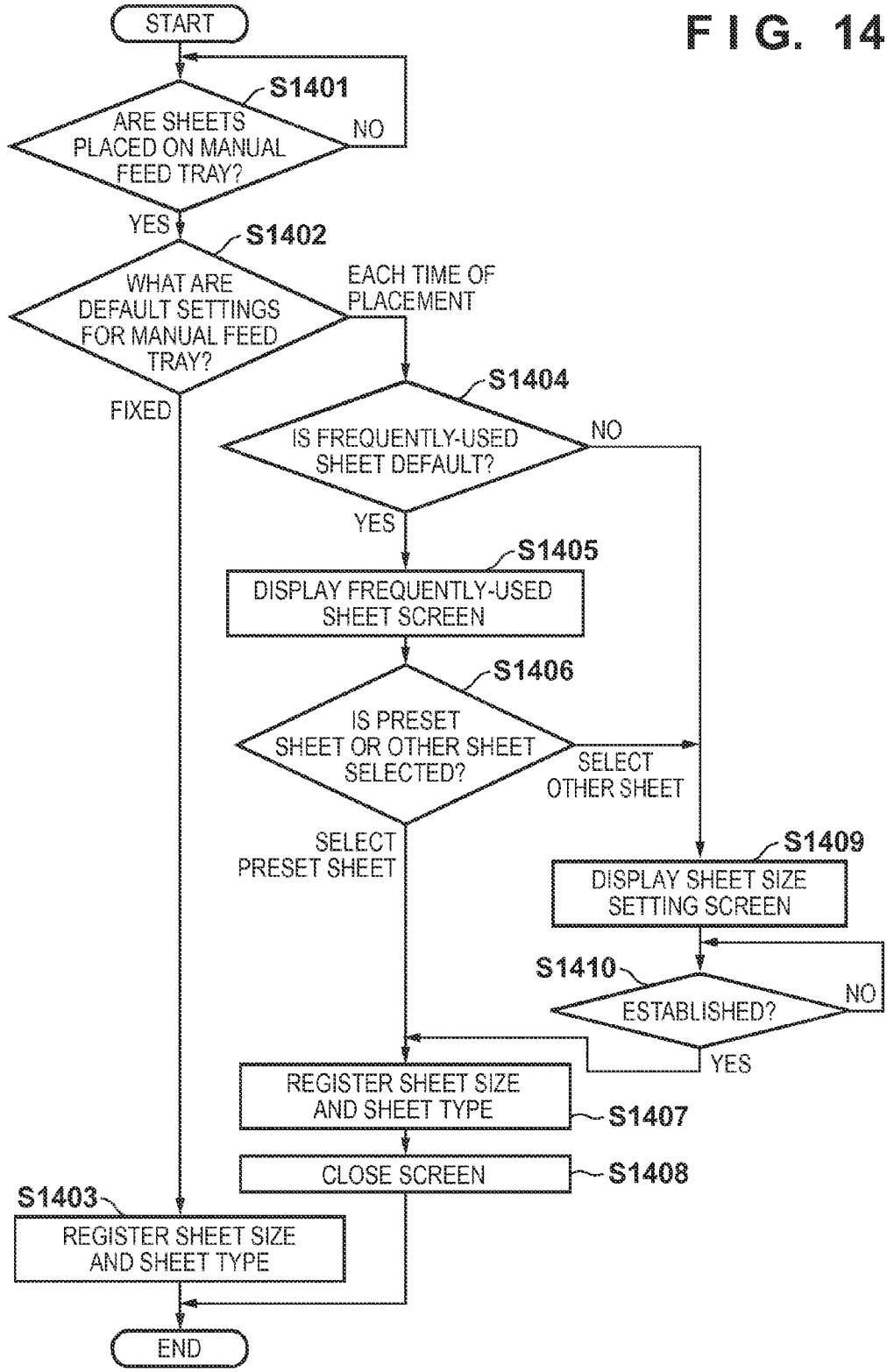
FIG. 14 is a flowchart for describing processing for setting sheet information for the manual feed tray in the MFP according to the second embodiment.

FIG. 14 is a flowchart for describing processing for setting sheet information for the manual feed tray 304 in the MFP 100 according to the second embodiment. Note that a program for executing this processing is installed in the disk 211, is deployed on the memory 202 at the time of execution, and is executed under control of the CPU 201.

First, in step S1401, the CPU 201 determines using the sensor 504 whether or not sheets have been placed on the manual feed tray 304. If it is determined that sheets have been placed on the manual feed tray 304, the procedure advances to step S1402, where the CPU 201 reads out default settings for the manual feed tray (FIG. 10D) stored in the memory 202 or the disk 211, and performs determination.

FIG. 10D is a diagram illustrating examples of information after default settings were configured for the manual feed tray 304 according to the second embodiment. Here, the default settings for the manual feed tray 304 include an item of "frequently-used setting" for instructing whether or not to set the set content.

Here, if the CPU 201 determines that the default settings are "fixed", the procedure advances to step S1403. Here, similarly to the step S1103 of FIG. 11, the CPU 201 sets the sheet size and the sheet type that were registered in FIG. 10D in a field for the manual feed tray of the sheet information (FIG. 10A), which is stored in the memory 202 or the disk 211, and the processing ends.

On the other hand, if the CPU 201 determines in step S1402 that the default settings are set "each time of placement", the procedure advances to step S1404, where it is determined whether the "frequently-used setting" of FIG. 10D is ON or OFF. If the "frequently-used setting" is ON, the procedure advances to step S1405, where the CPU 201 displays, on the display unit 203, the sheet information setting screen for frequently-used sheets shown in FIG. 9.

Next, in step S1406, the CPU 201 determines whether the OK button 905 or the "other sheet" button 906 is pressed after any one of the preset buttons 902 in the screen of FIG. 9 was pressed. If the CPU 201 determines that the OK button 905 was pressed, the procedure advances to step S1407, where the CPU 201 sets preset sheet information selected in the "frequently-used sheet" screen of FIG. 9 in the field for the manual feed tray of FIG. 10A. Then, the procedure advances to step S1408, where the CPU 201 deletes the "frequently-used sheet" screen of FIG. 9 from the display unit 203, and the processing ends.

On the other hand, if the CPU 201 determines in step S1406 that the "other sheet" button 906 was pressed, or the CPU 201 determines in step S1404 that the frequently used setting of FIG. 10D is OFF, the procedure advances to step S1409. In step S1409, the CPU 201 displays, on the display unit 203, the sheet size setting screen of FIG. 6A, and lets the user set the sheet size and the sheet type. Then, if the CPU 201 determines in step S1410 that the input sheet information was established, the CPU 201 sets the sheet information set in step S1409 in the field for the manual feed tray of FIG. 10A, and the processing ends.

In this second embodiment, it is possible to set sheet information to be set for the manual feed tray using the sheet size setting screen and the sheet type setting screen, similarly to the case of the other sheet feed cassettes. Furthermore, it is possible to select whether to set sheet information set for the manual feed tray as fixed, or to set sheet information each time, that is, at a timing at which sheets are placed on the manual feed tray. In the case of setting sheet information as fixed, when the user places sheets on the manual feed tray, sheet information such as the sheet size and the sheet type that are registered with respect to the manual feed tray are set for the manual feed tray. Furthermore, it is possible to designate whether or not sheet information to be set for the manual feed tray can be set via the sheet information setting screen for frequently-used sheets.

According to the second embodiment as described above, it is possible to set sheet information to be set for the manual feed tray at a timing at which sheets are placed on the manual feed tray, using the setting screen for frequently-used sheets. Therefore, when, for example, interruption occurred since the manual feed tray ran out of sheets, time and effort for setting sheet information for the manual feed tray can efficiently and significantly be reduced.

Note that although the first and second embodiments have described, taking setting of sheet information for the manual feed tray as an example, the present invention is not limited to the example, and is applicable to the case where sheet information is set for the sheet feed cassettes.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131054, filed Jun. 21, 2013, which is hereby incorporated by reference herein in its entirety.

What is claimed is:
1. A printing apparatus comprising:
a sheet holding unit configured to hold sheets;
a setting unit configured to set information on sheets held by the sheet holding unit; and
a printing unit configured to print images based on the information on sheets set by the setting unit, and
a control unit configured to:
(i) control a display unit to display, in a case that a job that uses the sheet holding unit has been interrupted due to lack of sheets when sheets are placed on the sheet holding unit, information on sheets used by the job and a prompt to confirm whether or not the displayed information is appropriate for the sheets placed on the sheet holding unit, and (ii) control, in a case that the displayed information is confirmed as appropriate for the sheets placed on the sheet holding unit, the printing unit to perform printing based on the displayed information.

2. The printing apparatus according to claim 1:
wherein the control unit is configured to control, when the interrupted job is cancelled after the information on sheets used by the job is displayed on the display unit, the display unit to display a screen for selecting information on sheets held by the sheet holding unit from among multiple pieces of sheet information.

3. The printing apparatus according to claim 1,
wherein the control unit is configured to control, in a case that a job that uses the sheet holding unit has not been interrupted due to lack of sheets when sheets are placed on the sheet holding unit, the display unit to display a screen for selecting information on sheets held by the sheet holding unit from among multiple pieces of sheet information.

4. The printing apparatus according to claim 1, further comprising:
a storage unit configured to store information on sheets set in advance,
wherein, if the information on sheets is stored in the storage unit, the printing unit performs printing based on the information on sheets stored in the storage unit.

5. The printing apparatus according to claim 1,
wherein the sheet holding unit is a manual feed tray.

6. The printing apparatus according to claim 1,
wherein the information on sheets is a sheet size or a sheet type.

7. A method for controlling a printing apparatus, comprising the steps of:
setting information on sheets held by a sheet holding unit for holding sheets in order to let a printing unit perform printing based on the information on sheets; and
controlling a display unit to display, in a case that a job that uses the sheet holding unit has been interrupted due to lack of sheets when sheets are placed on the sheet holding unit, information on sheets used by the job and a prompt to confirm whether or not the displayed information is appropriate for the sheets placed on the sheet holding means, and
controlling, in a case that the displayed information is confirmed as appropriate for the sheets placed on the sheet holding unit, the printing unit to perform printing based on the displayed information.

8. A non-transitory computer-readable storage medium storing a program for causing a computer to execute the method according to claim 7.

* * * * *